US012676080B2

(12) United States Patent
Crabbe et al.

(10) Patent No.: US 12,676,080 B2
(45) Date of Patent: Jul. 7, 2026

(54) MASTER DATA MODEL FOR AVIATION TRAINING

(71) Applicant: THE BOEING COMPANY, Arlington, VA (US)

(72) Inventors: James T. Crabbe, Tacoma, WA (US); Ken J. Cyr, Flower Mound, TX (US); Dennis Yip, Bellevue, WA (US); Miguel Herrera, Sammamish, WA (US); Trong Nguyen, Coppell, TX (US); Cay Tran, Coppell, TX (US)

(73) Assignee: The Boeing Company, Arlington, VA (US)

( * ) Notice: Subject to any disclaimer, the term of this patent is extended or adjusted under 35 U.S.C. 154(b) by 666 days.

(21) Appl. No.: 18/158,469

(22) Filed: Jan. 24, 2023

(65) Prior Publication Data

US 2024/0249638 A1      Jul. 25, 2024

(51) Int. Cl.
*G09B 9/24*          (2006.01)
(52) U.S. Cl.
CPC ..................................... *G09B 9/24* (2013.01)
(58) Field of Classification Search
CPC . G09B 9/24; G09B 9/003; G09B 9/44; G09B 9/54; G09B 9/006
See application file for complete search history.

(56) References Cited

U.S. PATENT DOCUMENTS

| | | | | |
|---|---|---|---|---|
| 8,616,884 B1 * | 12/2013 | Lechner | .................. | G09B 9/54 |
| | | | | 434/35 |
| 9,230,446 B1 * | 1/2016 | Mendro | .................. | G09B 9/44 |
| 10,032,111 B1 * | 7/2018 | Bertram | .................. | G09B 9/16 |
| 2016/0210871 A1 * | 7/2016 | Wokurka | .................. | G09B 9/02 |
| 2019/0304188 A1 | 10/2019 | Bridgeman et al. | | |
| 2021/0319150 A1 * | 10/2021 | Boyer | .................. | G06Q 10/067 |
| 2022/0406208 A1 * | 12/2022 | Ram | .................. | G09B 5/04 |

OTHER PUBLICATIONS

European Patent Office, Extended European Search Report for European Patent Application No. 23214064.0, dated May 29, 2024.

* cited by examiner

*Primary Examiner* — Omkar A Deodhar
(74) *Attorney, Agent, or Firm* — Harrity & Harrity, LLP

(57)      ABSTRACT

The present disclosure provides ingesting unstructured data (e.g., a flight manual) containing procedures for operating an aircraft and converting that unstructured data into semi-structured data that lists the procedures along with the steps in those procedures. Further, the procedural steps are converted into data structures that have an actor-verb-object format. In addition, the data structures are mapped to components in the aircraft and the components in the aircraft are mapped to corresponding components in a software flight simulator.

20 Claims, 8 Drawing Sheets

200

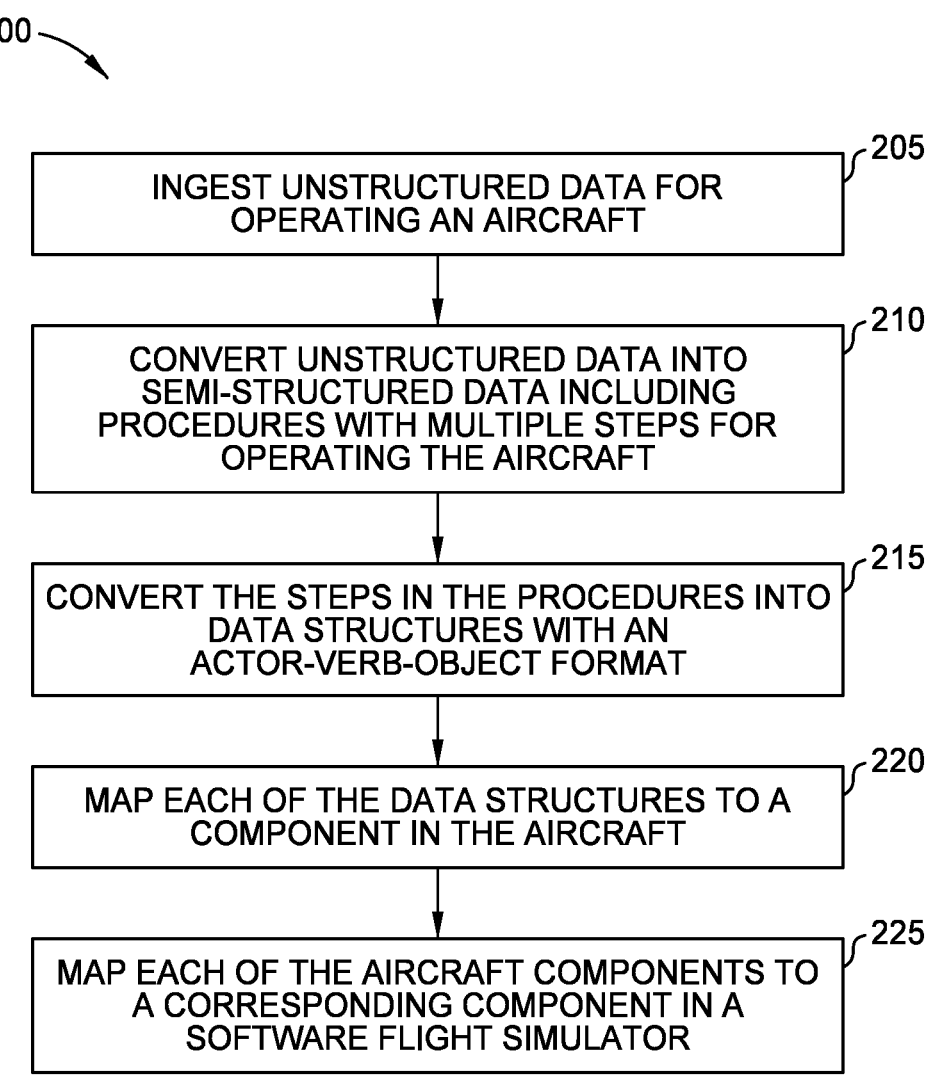

205

INGEST UNSTRUCTURED DATA FOR
OPERATING AN AIRCRAFT

210

CONVERT UNSTRUCTURED DATA INTO
SEMI-STRUCTURED DATA INCLUDING
PROCEDURES WITH MULTIPLE STEPS FOR
OPERATING THE AIRCRAFT

215

CONVERT THE STEPS IN THE PROCEDURES INTO
DATA STRUCTURES WITH AN
ACTOR-VERB-OBJECT FORMAT

220

MAP EACH OF THE DATA STRUCTURES TO A
COMPONENT IN THE AIRCRAFT

225

MAP EACH OF THE AIRCRAFT COMPONENTS TO
A CORRESPONDING COMPONENT IN A
SOFTWARE FLIGHT SIMULATOR

FIG. 2

Figure 3:
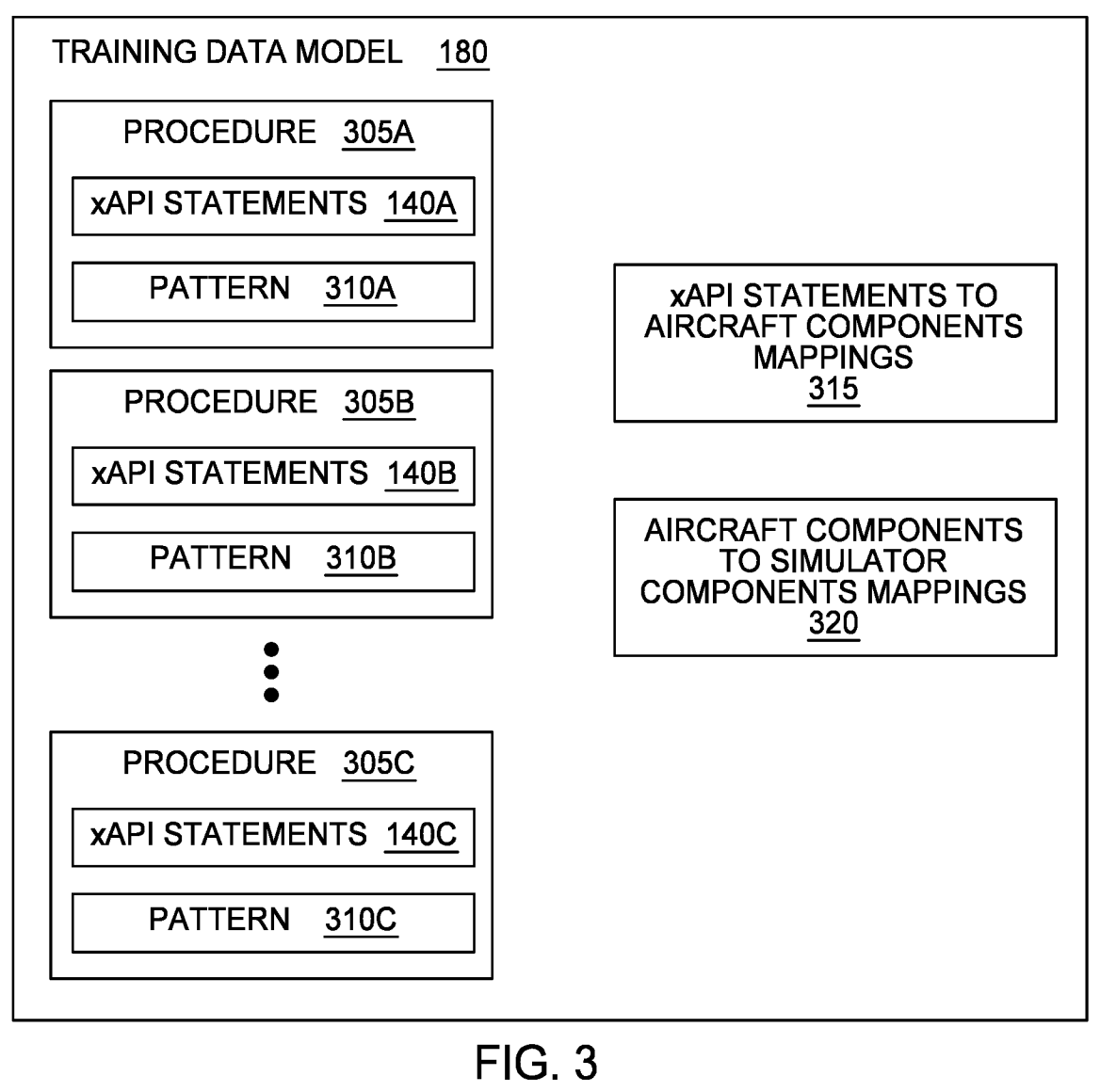

TRAINING DATA MODEL 180

PROCEDURE 305A
xAPI STATEMENTS 140A
PATTERN 310A

PROCEDURE 305B
xAPI STATEMENTS 140B
PATTERN 310B

PROCEDURE 305C
xAPI STATEMENTS 140C
PATTERN 310C xAPI STATEMENTS TO AIRCRAFT COMPONENTS MAPPINGS 315

AIRCRAFT COMPONENTS TO SIMULATOR COMPONENTS MAPPINGS 320

405
SELECT A PROCEDURE FROM THE
TRAINING DATA MODEL

410
MODIFY A STEP IN THE PROCEDURE

415
RECEIVE TEXTUAL DESCRIPTION FOR ONE OR
MORE STEPS IN THE PROCEDURE

420
PACKAGE THE DATA STRUCTURES AND THE
TEXTUAL DESCRIPTION INTO A FILE

700

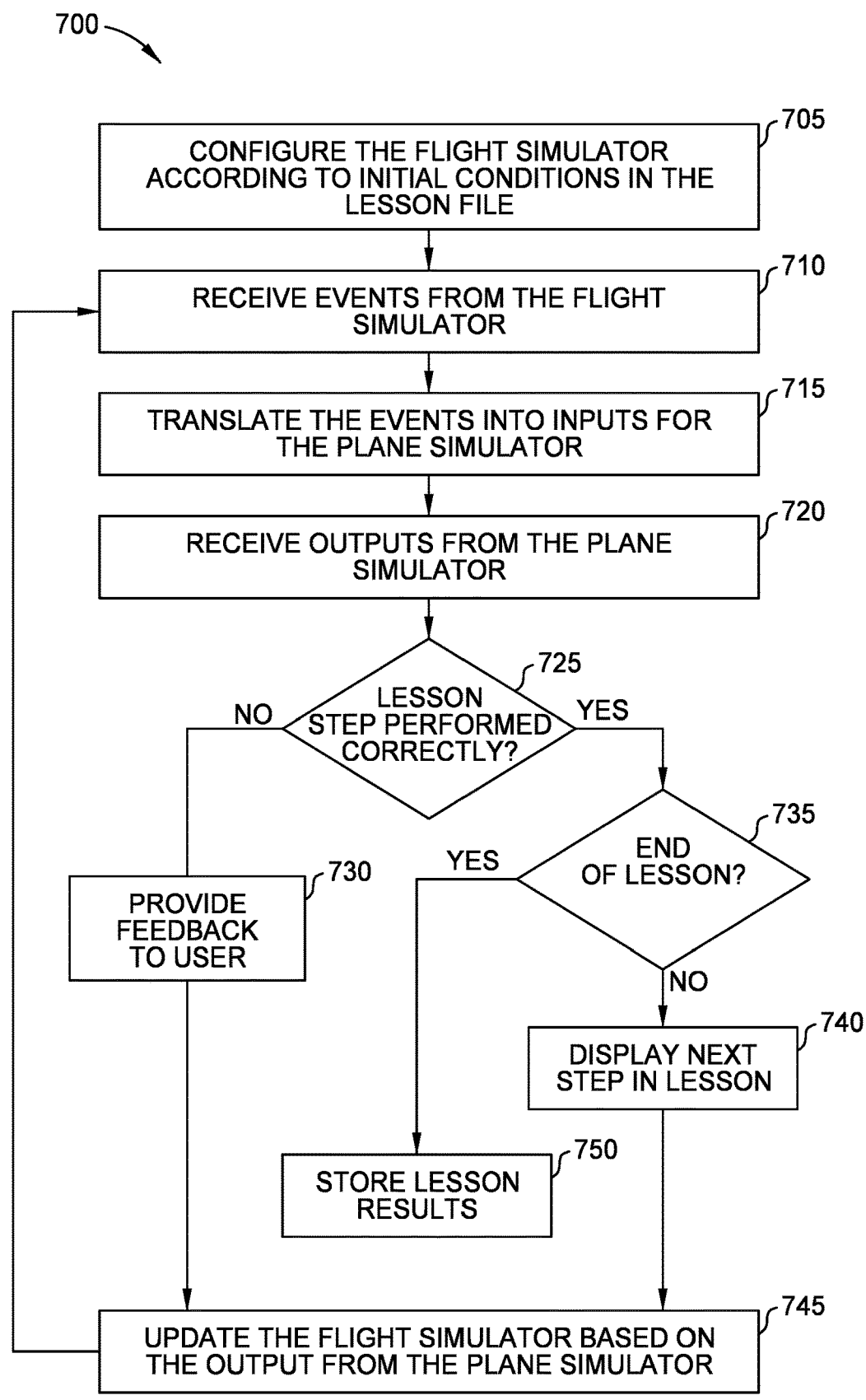

CONFIGURE THE FLIGHT SIMULATOR ACCORDING TO INITIAL CONDITIONS IN THE LESSON FILE ⌐705

RECEIVE EVENTS FROM THE FLIGHT SIMULATOR ⌐710

TRANSLATE THE EVENTS INTO INPUTS FOR THE PLANE SIMULATOR ⌐715

RECEIVE OUTPUTS FROM THE PLANE SIMULATOR ⌐720

LESSON STEP PERFORMED CORRECTLY? ⌐725

NO          YES

PROVIDE FEEDBACK TO USER ⌐730

YES          END OF LESSON? ⌐735

NO

DISPLAY NEXT STEP IN LESSON ⌐740

STORE LESSON RESULTS ⌐750

UPDATE THE FLIGHT SIMULATOR BASED ON THE OUTPUT FROM THE PLANE SIMULATOR ⌐745

FIG. 7

MASTER DATA MODEL FOR AVIATION TRAINING

FIELD

Aspects of the present disclosure relate to training pilots using a simulation system.

BACKGROUND

High fidelity aircraft simulators are extremely costly and difficult to manufacture. They require both complicated software and physical structures to accurately simulate flight operations. However, many pilot training lessons do not require a high fidelity aircraft simulator such as pre-flight operations, safety checks, taxing, and the like. Nonetheless, these actions either must be performed in high fidelity simulators or in an aircraft, which is costly and often requires the presence of a trainer in order to determine whether the trainee successfully completed the training tasks.

SUMMARY

The present disclosure provides a method, a system, or computer readable storage medium in several aspects, that include ingesting unstructured data comprising a plurality of procedures for operating an aircraft, converting the unstructured data into semi-structured data comprising multiple steps for each of the plurality of procedures, converting the steps in the plurality of procedures into data structures with an actor-verb-object format, mapping the data structures to components in the aircraft, and mapping the components in the aircraft to corresponding components in a software flight simulator.

In one aspect, in combination with any example above or below, the data structures are expressed in a data interchange format.

In one aspect, in combination with any example above or below, the data structures are experience application programming interface (xAPI) statements.

In one aspect, in combination with any example above or below, the unstructured data comprises a flight manual for operating the aircraft.

In one aspect, in combination with any example above or below, converting the unstructured data into the semi-structured data includes identifying a patterns in which the steps for each of the plurality of procedures must be performed in order to perform the plurality of procedures correctly.

In one aspect, in combination with any example above or below, converting the steps in the plurality of procedures into the data structures includes selecting, in response to user input, a procedure from the plurality of procedures to create a training lesson, receiving textual description for at least one step in the selected procedure, and packaging the data structures for the selected procedure and the textual description into a file that is executable by the software flight simulator.

In one aspect, in combination with the example above or below, the file is a JavaScript Object Notation (JSON) file.

In one aspect, in combination with the two examples above, the method includes modifying a step in the selected procedure by at least one of adding a new data structure with the actor-verb-object format or removing one of the data structures in the selected procedure.

BRIEF DESCRIPTION OF THE DRAWINGS

So that the manner in which the above recited features can be understood in detail, a more particular description, briefly summarized above, may be had by reference to example aspects, some of which are illustrated in the appended drawings.

FIG. 2 is a flowchart for generating a training data model, according to one aspect described herein.

FIG. 3 is a block diagram of a training data model, according to one aspect described herein.

FIG. 7 is a flowchart for operating a flight simulator to perform a training lesson, according to one aspect.

DETAILED DESCRIPTION

Figure 1:
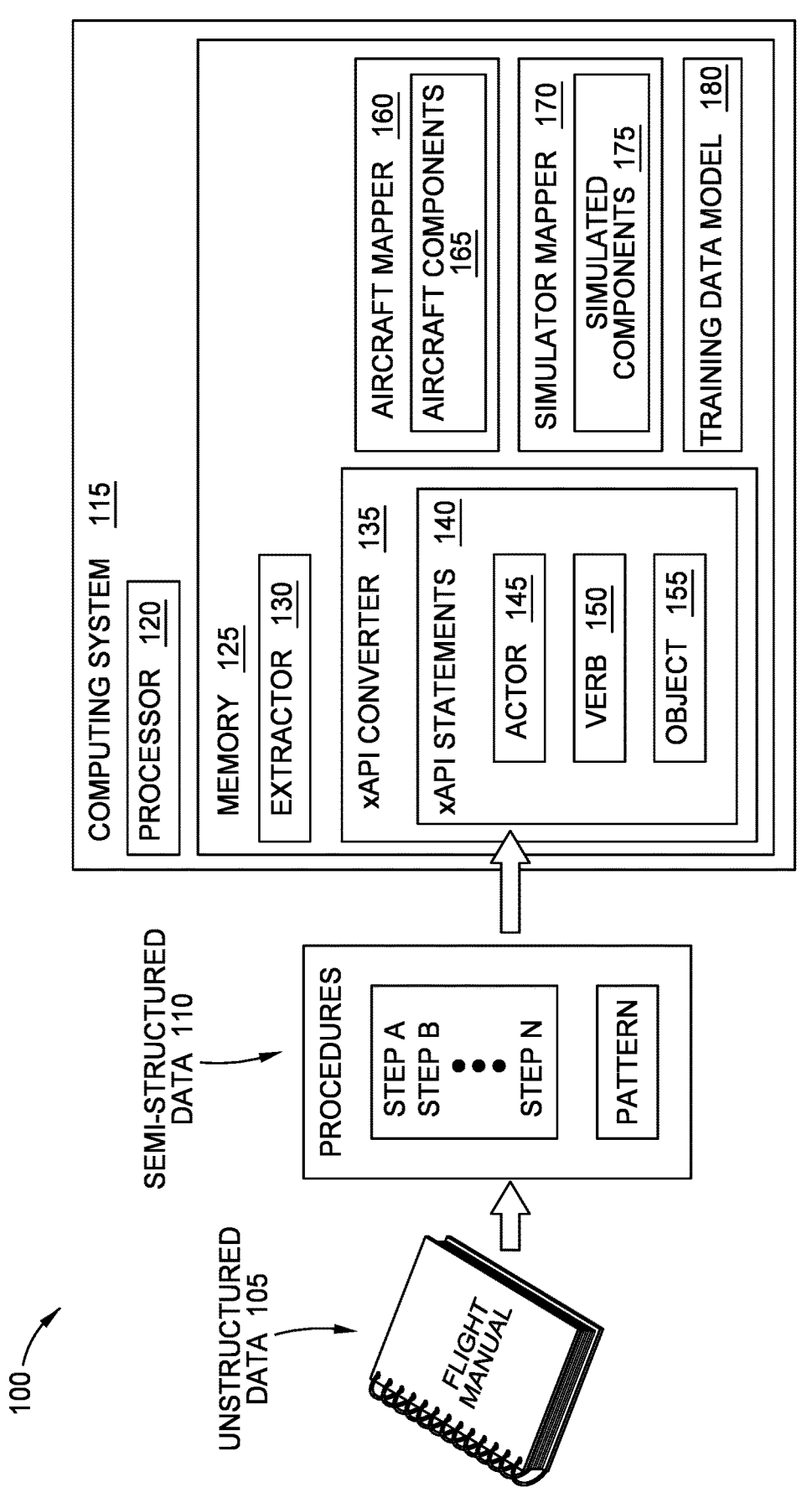
FIG. 1 depicts a system for generating a training data model, according to one aspect described herein.

One aspect described herein generates a training data model which provides an easy to use platform for generating training lessons for a pilot. The training data model can be based on a flight manual (e.g., a flight crew operating manual (FCOM)) for a particular aircraft. However, the flight manual is unstructured data which describes various procedures to be performed. The flight manual is typically written for a trained pilot, which means it does not have sufficient detail for training new pilots. To overcome these shortcomings, in one aspect, the flight manual is ingested and converted from unstructured data into semi-structured data that includes procedures with multiple steps. The steps in these procedures can then be converted into actor-verb-object data structures (e.g., experience application programming interface (xAPI) statements). For example, a step in a procedure of turning off a fuel pump can be converted into an actor-verb-object data structure where the pilot is the actor, turning off is the verb, and the switch for the fuel pump is the object.

The actor-verb-object data structures can also be mapped to aircraft components (e.g., switches, control systems, pedals, actuators, etc.) and the state of aircraft systems (e.g., a value of an altimeter or fuel level in a fuel tank). In turn, the aircraft components can be mapped to simulated components in a flight simulator. That way, the procedures (which include a plurality of actor-verb-object data structures) can be mapped to both the aircraft components and the components in a flight simulator. These procedures can then be stored in a training data model to provide "skeleton" training lessons that can be directly mapped to the procedures in the flight manual. A trainer can then select one of the procedures in the training data model and revise, update, and expand on the procedure to generate a training lesson that is executable in the flight simulator.

One aspect described herein is a system for executing a training lesson using a flight simulator. The system can include a commercial, off-the-shelf flight simulator that can be used to generate graphic user interfaces (GUIs) that can be displayed on a user device. However, these flight simulators are typically not used for training a pilot and are instead for entertainment (e.g., gaming flight simulators). As such, the flight simulators may not provide a sufficiently accurate simulation of a particular aircraft for training purposes. In one aspect, a work flow engine can monitor events generated by the flight simulator and use the events to update a plane simulator which is designed for accurately modeling a particular aircraft. Unlike the off-the-shelf flight simulator, the plane simulator can be software that does accurately simulate the plane. The advantage of using both types of simulators is that the system can leverage the GUI and user interaction functions provided by a flight simulator with the accuracy provided by the plane simulator. Thus, instead of having to develop (or use) a high fidelity simulator, many training lessons can be performed using the off-the-shelf flight simulator and a medium to low-fidelity plane simulator that does not need to produce GUIs or capture user input since these functions are performed by the flight simulator.

FIG. 1 depicts a system 100 for generating a training data model 180, according to one aspect described herein. The left side of FIG. 1 illustrates unstructured data 105, such as a flight manual (e.g., an FCOM) or other types of information about an aircraft. The unstructured data 105 can be written in human readable text. This data 105 is meant to be read and processed by a human and thus, is unstructured in the sense it cannot be directly interpreted by a computing system. If the unstructured data 105 is a paper manual, the system 100 may convert the data 105 into an electronic form (e.g., using optical character recognition).

FIG. 1 includes a computing system 115 with a processor 120 which represents one or more computing processors with any number of cores and memory 125 which can include volatile memory elements, nonvolatile memory elements, and combinations thereof. The memory 125 includes an extractor 130 (e.g., a software application) that converts the unstructured data 105 into semi-structured data 110. The semi-structured data 110 can include a list of procedures that are divided into one or more steps (e.g., Steps A, B, . . . N). In one aspect, the extractor 130 can parse the unstructured data 105 to identify different procedures for operating the aircraft. These procedures can include pre-flight checks, maintenance, taxiing, takeoff, flight, landing, and the like.

However, the procedures may be written for a trained pilot, which means they often do not have sufficient detail for training new pilots. For example, a procedure in the flight manual for handling fuel imbalance may instruct a pilot to turn off fuel pumps in the low tanks without any additional details. It is up to the pilot's training to identify which fuel tanks, and which switches to turn off since a plane can have multiple fuel pumps for the same fuel tanks. The extractor 130, with potentially the aid of a human expert, can identify the steps in the fuel imbalance procedure that may be inherent or missing in the procedure outlined in the unstructured data 105. For example, the extractor 130 can list the four fuel pumps in the aircraft and state where the switches for these fuel pumps are located. Moreover, the extractor 130 can add a step to inform the untrained pilot how to identify which of the fuel tanks is low.

In addition, the procedures can include a pattern to indicate how the untrained pilot should proceed through the steps. Some procedures may have to be performed sequentially—i.e., first Step A, then Step B, then Step C, etc. But in other procedures the steps can fan out—e.g., after performing Step A, perform both Step B and Step C but in any order before proceeding to Step D. In another example, only some steps have to be performed—e.g., after performing Step A, perform either Step B or Step C before proceeding to Step D. The pattern can indicate the manner in which the steps in the procedure have to be performed in order to correctly follow the procedure. This pattern can be generated programmatically by the extractor 130 or with the help of an expert.

The computing system 115 also includes an xAPI converter 135 that can convert the steps in the procedures of the semi-structured data 110 into xAPI statements 140 that include an actor 145 (e.g., the trainee), a verb 150 (e.g., action performed by the trainee), and object 155 (e.g., the object on which the action is performed). For example, a step in a fuel pump imbalance procedure can include a pilot turning off the switches for the low fuel tank. This can be converted into a xAPI statement 140 into an actor object (e.g., the trainee), a verb uniform resource identifier (URI) (e.g., deactivated or turned off), and an object field (e.g., fuel pump of low fuel tank). The xAPI statement 140 can be expressed using JavaScript Object Notation (JSON).

While xAPI statements 140 are described as a specific example, these statements can be any type of data structure that support actor-object-verb statements. The xAPI statements 140 provide a data structure for expressing the steps in the procedures that are easily interpretable and executable by a computing system. As described in FIG. 4, the xAPI statements 140 can be used to generate training lessons using a no-code solution where a trainer does not have to generate or write software code in order to create the lessons.

The computing system 115 also includes an aircraft mapper 160 (e.g., a software application) that maps the xAPI statements 140 into aircraft components 165. For example, the aircraft mapper 160 can may the objects that are acted upon in the xAPI statements 140 to a particular component in the aircraft, such as mapping a switch or fuel pump in the xAPI statement 140 to a particular switch or fuel pump in the aircraft.

The computing system 115 also includes a simulator mapper 170 (e.g., a software application) that maps simulated aircraft components 175 used by a flight simulator to the actual aircraft components 165. For example, a flight simulator may name its simulated aircraft components 175 differently than the actual aircraft components 165. For instance, the flight simulator may name a fuel pump switch as "fuel pump switch 1" while the actual fuel pump switch is named "aft/left fuel pump switch." The simulator mapper 170 can map these simulated to actual components so that events that change the states of simulated components 175 in the flight simulator can be mapped to actual components 165 in the aircraft.

Further, the simulator mapper 170 can map states of the aircraft components 165 (e.g., a switch can be "ON", "OFF", or "NEUTRAL") to states of the simulated components 175. That way, the states of the simulated components displayed by the simulator can be mapped to states of the aircraft components 165. Also, the states of the aircraft components 165 can be mapped to the procedures of the semi-structured data 110.

As described in FIG. 2, the computing system 115 can use the various modules described above to generate the training data model 180 which includes the procedures in the unstructured data 105 but with the means to generate computer executable training lessons for a flight simulator.

FIG. 2 is a flowchart of a method 200 for generating a training data model, according to one aspect described herein. At block 205, the computing system (e.g., the computing system 115 in FIG. 1) ingests unstructured data for operating an aircraft. In one aspect, the unstructured data includes multiple procedures for operating the aircraft. These operating procedures can include steps for flying the aircraft, preparing to fly the aircraft, steps to take after flying the aircraft, maintaining the aircraft, and/or troubleshooting. The operating procedures can be expressed in human language that is intended to be followed by a trained pilot. As such, the procedures may leave out certain steps that may not be known to an untrained pilot. The method 200 provides techniques for using the procedures outlined in the unstructured data to provide a training data model that can be used by a trainer to generate new training lessons that are executed on a flight simulator.

In one aspect, ingesting the unstructured data includes converting text from a manual or other operating specification of the aircraft into electronic data. However, in other aspects, the unstructured data may already be in an electronic format.

At block 210, the extractor (e.g., the extractor 130 in FIG. 1) converts the unstructured data into semi-structured data that includes procedures with multiple steps for operating the aircraft. For example, the extractor can parse the ingested unstructured data to identify separate procedures outlined in the data and then identify the steps in those procedures. This can be done use prompts in the unstructured data such as headers, page breaks, titles, etc. that indicate when a new procedure begins.

Further, the individual steps in the procedures may be indicated by bullet points, numbers, or words (e.g., Steps A, B, and C or 1, 2, and 3) which can be identified by the extractor as different steps in the same procedure.

In one aspect, an expert may provide input to the extractor to indicate a new procedure or identify the steps in the procedure. Moreover, the expert can identify steps that may be implied but not stated in the unstructured data. For example, the flight manual may have a step that says turn off the fuel pump(s) for the low fuel tank, but the expert can know there are two fuel tanks in the plane, each having two fuel pumps. The expert can deconstruct this step into four steps where two steps are used to turn off the two switches in the left fuel tank assuming it is the low fuel tank and another two steps are used to turn off the two switches in the right tank assuming it is the low fuel tank. By breaking down this single step in the unstructured data into four steps, the extractor can then have steps for testing both scenarios (e.g., when there is a fuel imbalance where the left tank is low and when the right tank is low). As discussed later, having steps to test multiple scenarios gives more options to the trainer when developing training lessons.

In one aspect, the exactor and the expert can determine a pattern in which the steps in the procedure should be executed. For example, some steps may have to be executed sequentially, while other steps are executed in parallel. In yet another example, some steps may be optional (perform Step 1 or Step 2 before proceeding to Step 3). A procedure may have multiple patterns. For example, a procedure may require the first three steps to performed sequentially while the next three steps can be performed in parallel in no particular order. The extractor can embed the pattern (or patterns) used to execute the steps within the semi-structured data.

At block 215, an xAPI converter (e.g, the xAPI converter 135 in FIG. 1) converts the steps in the procedures into data structures with an actor-verb-object format. In one aspect, the steps are converted into xAPI statements, but these are just one suitable example.

The xAPI converter can parse the semi-structured data to identify, in each step, the actor, the action performed by the actor, and the object. This information can then be used to create a corresponding xAPI statement using a data interchange format.

At block 220, an aircraft mapper (e.g., the aircraft mapper 160 in FIG. 1) maps each of the data structures to a component in the aircraft. In one aspect, more specifically, the aircraft mapper maps the objects in the data structures to aircraft components. Thus, each data structure can be mapped to performing an action on a specific component in the airplane (throttle, switch, touch screen in the cockpit, etc.).

At block 225, a simulator mapper (e.g., the simulator mapper 170) maps each of the aircraft components to a corresponding component in a software flight simulator. As mentioned above, the flight simulator may name its simulated aircraft components differently than the actual aircraft components. For instance, the flight simulator may name a fuel pump switch as "fuel pump switch 1" while the actual fuel pump switch is named "aft/left fuel pump switch." The simulator mapper can map these simulated to actual components so that events that change the state of the simulated components in the flight simulator can be mapped to actual components in the aircraft.

Moreover, mapping the simulated components in the flight simulator to the actual aircraft components can link the data structures (e.g., xAPI statements) to the simulated components. For example, if when performing a training lesson, the trainee flips a switch in the flight simulator, the backend system (which is discussed in FIGS. 5-8) can determine whether that action maps to one of the xAPI statements in the training lesson. If so, the backend system can determine that the trainee performed the step correctly.

In one aspect, block 225 can be repeated to generate a training data model that supports different flight simulators. For example, there are multiple different commercially available flight simulators, which each have different simulated components. Block 225 can be used to generate mappings of the actual aircraft components to the simulated components for each of these flight simulators. Thus, the resulting training data model can be used with a plurality of different flight simulators.

With the data and mappings determined in the method 200, the system can generate a training data model that includes procedures that can be selected, and modified, to provide training lessons for untrained pilots.

FIG. 3 is a block diagram of a training data model 180, according to one aspect described herein. The training data model 180 includes multiple procedures 305A-C as well as xAPI statements to aircraft components mappings 315 and aircraft components to simulator components mappings 320. The xAPI statements to aircraft components mappings 315 can be generated at block 220 in FIG. 2 while the aircraft components to simulator components mappings 320 can be generated at block 225 in FIG. 2. The mappings 315 and 320 can also map the states of the actual and simulated aircraft components (e.g., a switch can be "ON", "OFF", or "NEUTRAL").

The procedures 305 can be generated using blocks 205-215 in FIG. 2. Each of the procedures 305 include a set of xAPI statements 140 and one or more patterns 310. The set of xAPI statements 140 may be different for each procedure 305, but the procedures may have multiple xAPI statements 140 in common.

Further, a procedure 305 may have multiple different patterns 310 where some patterns apply to a sub-portion of the xAPI statements 140. For example, a first pattern may indicate the first three xAPI statements 140 of the procedure have to be performed sequentially, while a second pattern indicates the next two xAPI statements 140 can be performed in parallel and a third pattern indicates only one of the last two xAPI statements 140 have to be performed for the procedure to be executed correctly.

In one aspect, the method 200 can be used to generate a training data model 300 based on different unstructured data. For example, the method 200 can be performed a first time to generate a first training data model 300 using the flight manual generated by the manufacturer of the aircraft. The method 200 can then be performed a second time to generate a second training data model 300 using the flight manual produced by the operator of the aircraft. The procedures in the first training data model can be compared to the procedures in the second training data model to identify the procedures with different steps. This can be used to identify different procedures and which procedures may be better (or deficient). This information can be used to update the flight manuals or to obtain government regulatory approval (if one of the flight manuals has already been approved). Moreover, comparing the procedures can improve safety. For example, if an operator were to make a change or edit to a procedure that is not safe, they could be presented with a "flag" or alert. The manufacture could also be notified to follow up with the operator to ensure a conversation takes place explaining why the modification may not be safe to train.

Figure 4:
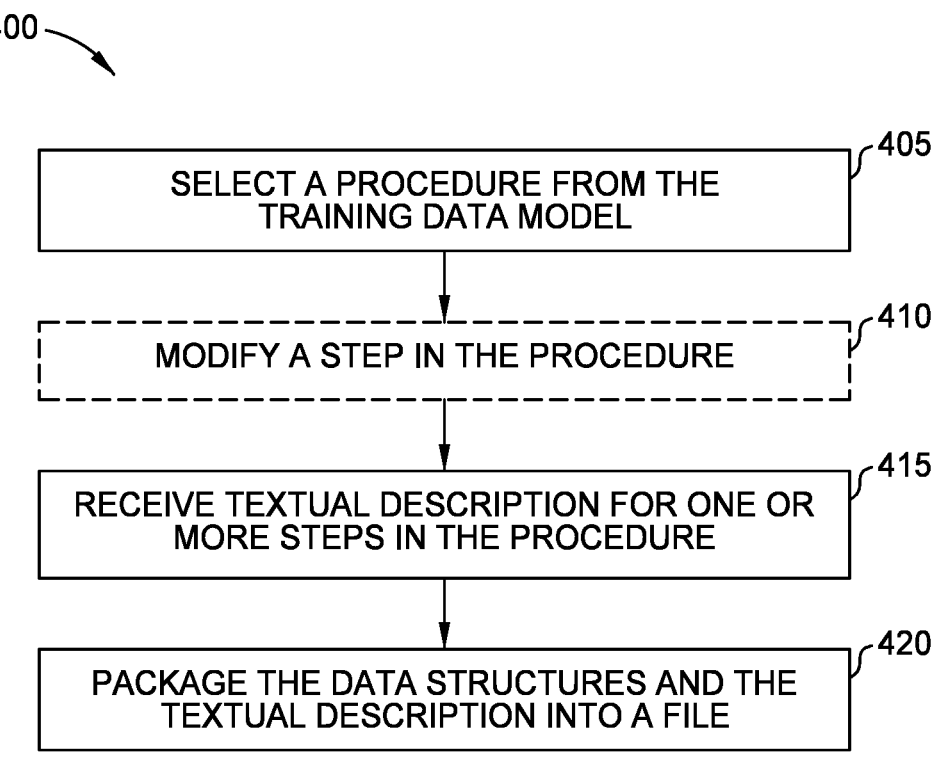
FIG. 4 is a flowchart for generating training lessons using a training data model, according to one aspect described herein.

FIG. 4 is a flowchart of a method 400 for generating training lessons using a training data model, according to one aspect described herein. In one aspect, the method 400 assumes that a training data model (e.g., the model 180 shown in FIG. 3) has already been created.

In one aspect, the method 400 is a no-code method for generating training lessons. That is, prior solutions required an flight instructor (who is usually unfamiliar with computer programming) to work with a computer programmer (who is usually unfamiliar with flight training lessons) to program lessons that can be implemented on a flight simulator. This is a time consuming and expensive process. In contrast, by leveraging the training data model, an instructor can perform the method 400 without having to write any additional software code to generate a training lesson that is executable on a flight simulator. Thus, the method 400 can be performed by someone without software programming experience, or without the help of someone with software programming experience.

At block 405, an instructor selects a procedure from the training data model. In one aspect, a computing system provides a user interface which lists the procedures in the training data model. For example, the procedures in the training data model may be indexed or otherwise be searchable so that an instructor can identify and select a procedure that corresponds to a desired training lesson.

At block 410, the instructor can modify a step in the selected procedure. For example, the instructor may want the trainee to perform an additional step as part of the procedure that was not listed in the procedure (e.g., was not part of the unstructured data and was not added by the extractor). For instance, if the pilot is being trained to fly aircraft in a dusty or sandy environment, the instructor may add more steps to verify that a filter or air intake has not been clogged. Advantageously, the procedure still includes the steps from the original procedure, but the system can create additional steps defined by the instructor and convert those steps into additional xAPI statements that can be added to the procedure. For example, when adding a new step, the user interface can provide fields where the instructor defines the actor, verb, and object of the new step which the extractor can then convert into an xAPI statement using a data interchange format.

In one aspect, the instructor can remove steps from the procedure, or change the pattern corresponding to the steps. However, this may mean the procedure is no longer approved by a regulatory government authority. For example, in one aspect, all the procedures in the flight manual (e.g., the unstructured data) may be approved by the regulatory government authority. Adding steps to the procedure may mean the resulting training lesson still has the approval of the regulatory government authority since the original steps are still performed. However, removing steps may mean the resulting training lesson may no longer be approved by the regulatory government authority.

In any case, block 410 is optional as indicated by the dashed lines.

At block 415, the user interface receives textual description for one or more steps in the selected procedure. Typically, the steps of the procedures in flight manuals do not have much written description and simply explain the action that needs to be performed. In contrast, an instructor might want to add more text to help the trainee identify the aircraft component and provide the "why" a particular step should be performed. The user interface can provide fields for the instructor to provide additional information that can be entered into the xAPI statement for a step.

At block 420, a computing system packages the steps of the procedure selected by the instructor and the textual description into a file. The file is executable by a flight simulator to perform the training lesson. In one aspect, the file may be a JSON file or XML file. FIGS. 5-8 below describe various systems that can use the training lesson file to perform a training lesson on a flight simulator.

On advantage of method 400 is that the steps and changes made by the instructor can be tracked to show how the resulting training lesson still does (or does not) satisfy the original procedure. For example, the resulting procedure can be compared with the original procedure to determine whether the resulting procedure has the same steps being performed in the same pattern. The resulting procedure could have additional steps and more text, but still have the steps from the original procedure. This may make an easy way to certify that the training lesson still meets the requirements of the regulatory government authority. If not, then the training lesson may have to be recertified by the government authority.

Figure 5:
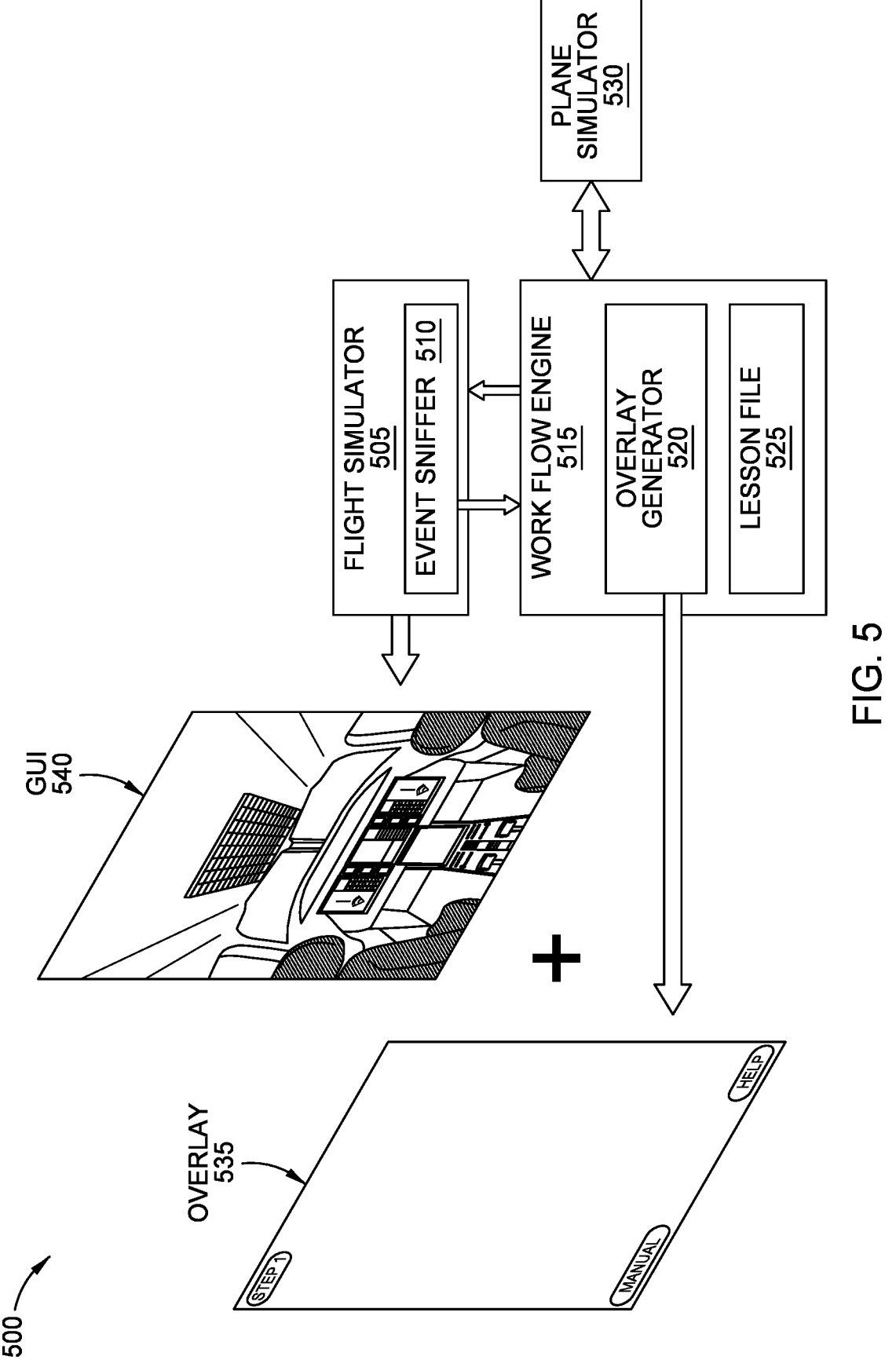
FIG. 5 illustrates a system for executing a training lesson using a flight simulator, according to one aspect.

FIG. 5 illustrates a system 500 for executing a training lesson using a flight simulator 505, according to one aspect. In one aspect, the flight simulator 505 can receive and execute a training lesson file 525 generated using the training model and the method 400 described above. However, the description of FIGS. 5-8 can be used with other techniques for generating training lesson files 525 than the ones described above in FIGS. 1-4.

The flight simulator 505 can be any software application that provides a simulated cockpit or flying experience to a user via a display device. As shown, the flight simulator 505 outputs a graphical user interface (GUI) 540 for display on a user device (not shown). In this example, the GUI 540 provides a view of a cockpit of an aircraft. The user can then use input devices such as a touch screen, mouse, keyboard, trackpad, virtual reality (VR) headsets, gaming controllers, etc. to provide input to the flight simulator 505 which changes the GUI 540 output by the flight simulator 505. For example, the user may use an input device to change the view to look more to the right or left. Or the user may use an input device to interact with a simulated component being displayed (e.g., a switch, touch screen, throttle, pedal displayed in the GUI 540). As the user provides input, the flight simulator 505 can update the GUI 540 in response to the input to give the user the impression she is operating the aircraft as discussed below.

In one aspect, the flight simulator 505 is an off-the-shelf flight simulator which may be typically used for entertainment or gaming purposes, rather than for training pilots to fly actual aircraft. As such, the flight simulator 505 may not have sufficient fidelity or accurate behavior to sufficiently simulate the actual functionality of the real aircraft being simulated. Despite these shortcomings, the system 500 can nonetheless leverage the flight simulator's ability to generate the GUIs 540 and receive input from the user to produce a sufficiently accurate simulation system for the aircraft.

The system 500 also includes a work flow engine 515 and a plane simulator 530. The work flow engine 515 (e.g., a software application) serves as middleware between the flight simulator 505 and the plane simulator 530. In this example, the flight simulator 505 includes an event sniffer 510 (which can be an add-on to the flight simulator 505) that identifies events that occur which affect the functionality of the aircraft being simulated. For example, if the user changes the view of the cockpit in the GUI 540, this event may not be selected or identified by the event sniffer 510 since it does not change the functionality of the airplane. In contrast, if the user flips a switch in the cockpit or changes a setting of a flight parameter, the event sniffer 510 can determine this event may affect the function of the aircraft and forward the event to the work flow engine 515.

In turn, the workflow engine 515 forwards the event to the plane simulator 530. The plane simulator 530 (e.g., a software application) may be a higher fidelity simulator than the flight simulator 505 which more accurately models or simulates the functionality of the actual aircraft. For example, while the flight simulator 505 can include models and cockpits for multiple different aircraft, the plane simulator 530 may have a model for only a single aircraft. Advantageously, the plane simulator 530 does not have to include any kind of input/output functions to interact with a user since this is provided by the flight simulator 505. Instead, the plane simulator 530 can include accurate mathematical and physic based models of the aircraft and data structures for receiving the events from the work flow engine 515, simulating these events on the aircraft, and then transmitting the effects or result of these events to the work flow engine 515. In turn, the work flow engine 515 can provide additional output to the flight simulator 505 which may change the GUI 540.

As an example, the user may flip a switch in the simulated cockpit that turns off an aircraft component. The event sniffer 510 can report this to the work flow engine 515 which in turn reports the changed status of the switch to the plane simulator 530. The plane simulator 530 may determine that flipping the switch causes an alarm or other output and inform the work flow engine 515. The engine 515 then pushes this information to the flight simulator 505 and instructs the flight simulator 505 to update the GUI 540 to show the alarm or other output. In this manner, the flight simulator 505 can be completely unaware of the reason for the alarm, but can nonetheless output the alarm to the GUI 540.

Using two simulators has several advantages. As already discussed, the flight simulator can be lower fidelity while the plane simulator 530, which is a higher fidelity simulator, does not need to have input/output functions but can instead rely on the flight simulator 505. In addition, using two simulators means any proprietary or confidential aircraft models used by the plane simulator 530 can be kept separate from the flight simulator 505. That is, the flight simulator can gather user input and display the results of that input without knowing how the plane simulator 530 works. This increases data security where the plane simulator 530 can function separately from the flight simulator 505 rather than being integrated into the flight simulator 505.

Because the flight simulator 505 and the plane simulator 530 can be two separate simulators developed by two different entities, they may call or label different aircraft components different names. For example, what the flight simulator 505 labels as a Fuel Pump Switch 1 the plane simulator 530 may call Aft/left Fuel Pump Switch. Because of the different namespaces used by the two simulators to describe the same components, the work flow engine 515 can use the aircraft components to simulator components mappings 320 described in FIG. 3 to perform conversions when transmitting data between the flight simulator 505 and the plane simulator 530. For example, when receiving an event from the event sniffer 510 indicating the user changed the state of the Fuel Pump Switch 1, the work flow engine 515 can convert this to an event that changes the state of the Aft/left Fuel Pump Switch and transmit the event to the plane simulator 530. In this manner, the flight simulator 505 and the plane simulator 530 can be developed and maintained without having to worry about what the namespace of the other simulator since the work flow engine 515 can convert events between the two namespaces.

In addition to transmitting events and updated data between the two simulators, the work flow engine 515 also includes an overlay generator 520 that generates an overlay 535 for the GUI 540. The information in the overlay 535 is based on the training lesson file 525. In one aspect, the overlay 535 is used to output information from the lesson file 525 to the user (e.g., the trainee). Generally, the overlay 535 is transparent so that when merged with the GUI 540, the objects, text, and view provided by the GUI 540 are visible to the user. However, the overlay 535 includes portions that are non-transparent that occlude corresponding portions of the GUI 540. For example, the overlay 535 includes a "Step 1" that might include an instruction to the trainee explaining how to complete the first step of the training lesson. In addition to text, the overlay 535 can include buttons such as "manual" that when selected by the user opens up the flight manual in the overlay 535 and "help" which when selected opens up additional information or cues for completing Step 1.

In another embodiment, the overlay 535 is used to display additional materials or views to enable simultaneous training that is contextual. For example, if the trainee is learning the fuel imbalance procedure, the system could update the overlay 535 to display system diagrams that are animated by the workflow engine to show the fuel moving from one tank to another. Often, systems training is a different training event from procedural training. However, using the system described herein, the trainee can learn how systems in the aircraft work, while simultaneously learning procedures/action steps. This has the potential to reduce the hours required to learn how to operate the aircraft while also learning how the aircraft itself operates at a system level.

The overlay generator 520 can update the overlay 535 as the trainee progresses through the procedure. For example, assume Step 1 instructs the trainee to flip a switch to turn off a fuel pump. The event sniffer 510 can monitor events generated by the flight simulator 505 and send these events to the work flow engine 515 as discussed above. If the work flow engine 515 identifies an event where the user flipped the correct switch, in response, the overlay generator 520 can then display a confirmation such as "Correct!" on the overlay 535 and then display the instructions for Step 2 in the same location of the overlay 535 that previously displayed the instructions for Step 1. Additionally, if the trainee selected the wrong switch, this can be detected by the event sniffer 510 and the work flow engine 515, and in response, the overlay generator 520 can change the overlay 535 to provide feedback such as "Incorrect switch selected."

In one aspect, the instructor or trainee can set a difficultly level for an experience. In this way prompts, support images, text, or materials can be provided easily and at each step for easy mode. In contrast, in expert mode the system may just prompt the trainee to execute the procedure with no additional prompts unless the trainee request aid or takes too long to perform the required action to proceed. This can be managed by the workflow engine 515.

In one aspect, the flight simulator 505 is unaware of the overlay 535 and the information it contains. Instead, the overlay generator 520 can receive the GUI 540 from the flight simulator 505 and merge it with the overlay 535 to create a combined GUI. This combined GUI can then be transmitted for display to the user. As such, the user sees a GUI that is a combination of the information in the overlay 535 and the GUI 540.

In one aspect, the work flow engine 515 can track the trainee's progress through the lesson defined in the file 525. This can include tracking which steps the trainee performed correctly and which were performed incorrectly. This information can be used to with other training information such as in-plane training and classroom instruction to give a complete picture of the trainee's progress and achievements. Also, the system 500 provides an objective view of the trainee's ability to complete the lesson, unlike in-plane training and classroom instruction which may be affected by the subjective view of an instructor.

Figure 6:
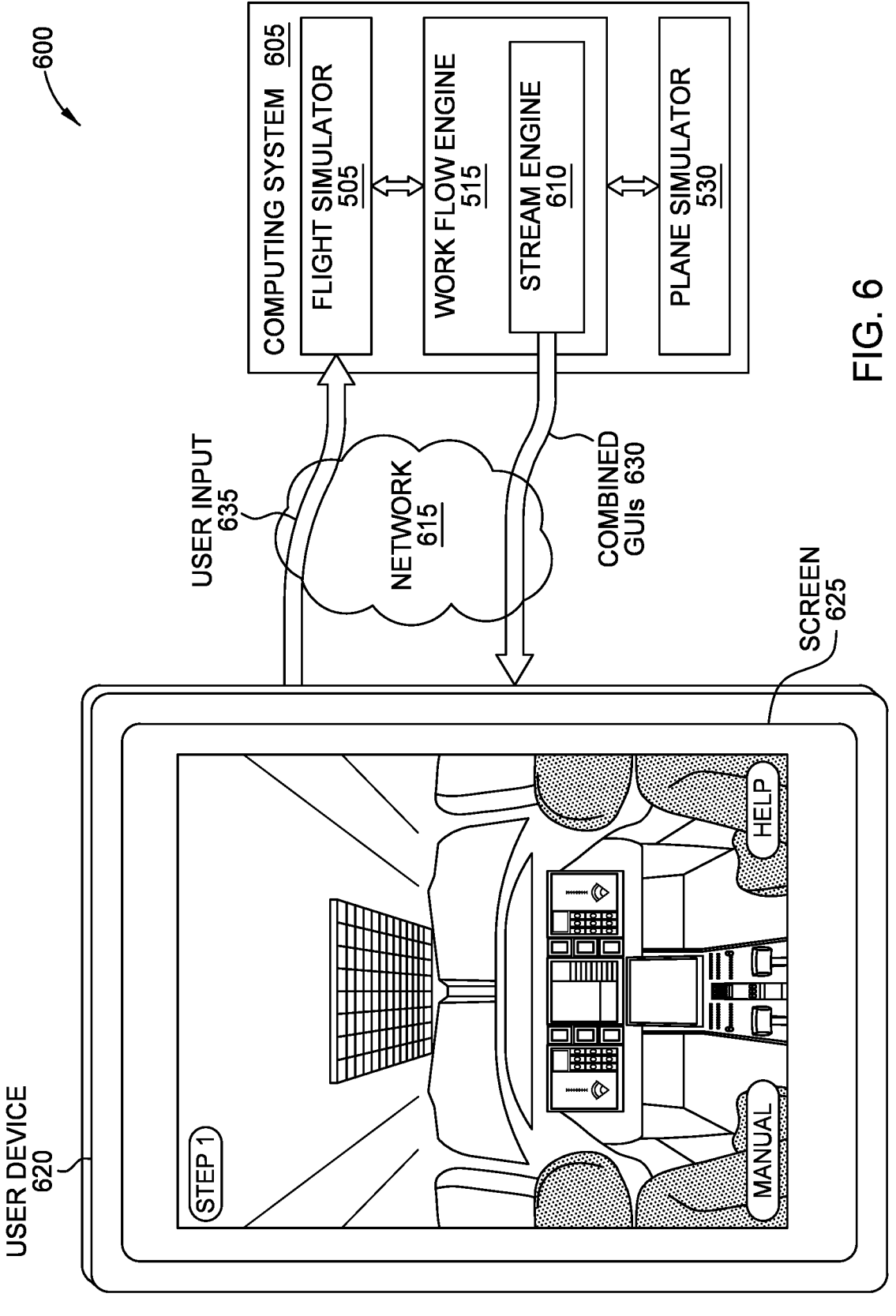
FIG. 6 illustrates a system for executing a training lesson using a flight simulator, according to one aspect.

FIG. 6 illustrates a system 600 for executing a training lesson using a flight simulator 505, according to one aspect. Executing a flight simulator 505 and a plane simulator 530 are typically compute intensive tasks. Even executing the flight simulator 505 on a first computing system and the plane simulator 530 on a second computing system requires more processing power and memory than offered by many types of computing systems such as laptops and tablets. However, it may be desirable to not limit training to more powerful computing system. Instead, FIG. 6 illustrates a training system 600 where the flight simulator 505 and the plane simulator 530 can be executed on a computing system 605 that is separate from a user device 620.

In this example, the computing system 605 can be a single computing device (e.g., a desktop or server) or a computing environment such as a data center or a cloud computing environment. For example, the flight simulator 505 may be executed by a first computing system in the cloud computing environment (e.g., a virtual machine or container) while the plane simulator 530 is executed by a second computing system in the cloud computing environment.

In contrast, the user device 620 (e.g., a desktop, laptop, tablet, smartphone, etc.) may have significantly less computing resources than the computing system 605, but also performs computing tasks that are much less compute intensive. In this example, the user device 620 is connected to the computing system 605 by a network 615 (e.g., a public or private network). The work flow engine 515 includes a stream engine 610 that streams combined GUIs 630 over the network 615 to the user device 620. In one aspect, a combined GUI 630 is the result of merging the overlay 535 with the GUI 540 generated by the flight simulator 505 as shown in FIG. 5. The stream engine 610 may stream the combined GUIs 630 to the user device 620 at a preferred frame rate (e.g., 30 or 40 frames per second) where each frame is a combined GUI 430.

The user device 620 has a screen 625 for displaying the combined GUIs 430 received from the stream engine 610. The user device 620 can then receive user input via a user device which can be part of the user device 620 (e.g., a touch screen or integrated buttons) or from connected input devices such as a keyboard, mouse, or gaming controller. This user input 635 is then transmitted over the network 615 to the flight simulator 505 which, as described above, generates events that can be evaluated by the flight simulator 505, the work flow engine 515, and the plane simulator 530 to generate new combined GUIs 630 that are then forwarded to the user device 620. In this manner, the user device 620 performs relatively light-weight computing functions such as displaying received GUIs 630 and receiving user input. The heavier-weight computing functions are performed by the computing system 605 such as graphics processing, plane simulation, and event processing.

Further, the system 600 provides more flexibility to the trainee where and when she performs training (so long as she has access to the network 615). Rather than having to perform training at the physical location having the computing system 605 (which can be bulky), the trainee could, for example, perform training using a tablet or laptop at a remote location. Further, remote training may be preferred so that the computing system 605 executing the plane simulator 530, which may contain confidential or proprietary data, can be in a secure location but the trainee can be in any location. Since the data being transmitted to the user device 620 in this example is only a GUI 630, there is little security risk.

While FIG. 6 illustrates a distant learning or training environment, the aspects herein could be performed by a single computing device. For example, the computing system 605 could include a display and user input devices, in which case the training could be performed at a single location.

FIG. 7 is a flowchart of a method 700 for operating a flight simulator to perform a training lesson, according to one aspect. At block 705, the work flow engine (e.g., the work flow engine 515 in FIG. 5) configures the flight simulator (e.g., the flight simulator 505 in FIG. 5) to initial conditions in the lesson file (e.g., the lesson file 525 in FIG. 5, which may be a JSON file). For example, instead of the trainee having to initialize the flight simulator, the lesson file can include parameters that the work flow engine can use to provide the correct context for the lesson. For example, the lesson file may indicate which airplane the lesson is for, and in response, instruct the flight simulator to load the cockpit for that airplane. Moreover, if the lesson is regarding a taxing situation, the flight simulator may place the airplane on a tarmac. If the lesson is regarding an emergency situation, the work engine can set parameters in the flight simulator to output the alarms and the flight parameters corresponding to the emergency. Thus, after selecting a training lesson, the work flow engine can use the corresponding lesson file to programmatically initialize the flight simulator so the trainee does not have to.

At block 710, the work flow engine receives events from the flight simulator that affect the operation of the aircraft. For example, these events can include control inputs (e.g., the user flips a switch, changes aircraft speed or direction, activates/deactivates a control system, and the like). In contrast, the work flow engine may not receive events that do not control the operation of the aircraft such as the user changing her view of the cockpit, navigating between menus in a flight controller in the cockpit (without changing any inputs), and the like. As discussed above, an event sniffer in the flight simulator may determine which events affect the operation of the aircraft and which do not. In one aspect, the event sniffer forwards only the events that affect the operation of the aircraft to the work flow engine.

At block 715, the work flow engine translates the events into inputs for the plane simulator. For example, the events may be received in a format that is different than a format used to provide input to the plane simulator. As one particular example, the namespace used by the flight simulator may be different than the namespace used by the plane simulator. In that case, the mappings 320 in FIG. 3 can be used to switch between the namespaces when translating the events received from the flight simulator into inputs for the plane simulator.

At block 720, the work flow engine receives outputs from the plane simulator. These outputs can indicate how the function or operation of the airplane changed because of the inputs provided at block 715. For example, if the user tilted the aircraft, the plane simulator can calculate the affect this has on the airspeed, direction, and other flight parameters. The plane simulator can output the updated flight parameters to the work flow engine.

At block 725, the work flow engine determines whether a lesson step was performed correctly. In one aspect, the work flow engine can monitor the events received from the flight simulator and/or the outputs of the plane simulator to determine whether a step was performed correctly. For example, if the step required the trainee to flip a switch, an event from the flight simulator may be sufficient to determine if this step was performed correctly. However, if the step required the trainee to reduce the speed of the aircraft or to reduce a load on a particular component, the work flow engine may evaluate the outputs received from the plane simulator to determine whether this step was performed correctly.

As part of determining whether a step was performed correctly, the work flow engine can consider the pattern in which steps are to be performed. For example, the user may have to perform the steps sequentially, but in other lessons the system may display multiple steps simultaneously. The user may have to perform only one of these steps, or must perform all the steps, but in any order. These information can be stored in the patterns 310 illustrated in FIG. 3.

If the step was not performed correctly, the method 700 proceeds to block 730 to provide feedback to the user or trainee. For example, the overlay engine may update the overlay to indicate the user performed an incorrect action. Optionally, the overlay engine may not provide any feedback, but instead continue to display the current instructions until the user performs the correct action.

If the step was performed correctly, the method 700 proceeds to block 735 where the work flow engine determines whether the current step was the last step in the lesson (or procedure). If not, the method 700 proceeds to block 740 where the overlay generator displays the next step in the lesson. In one aspect, the overlay generator removes the previous step from the overlay and replaces it with text corresponding to the next step in the lesson.

At block 745, the work flow engine updates the flight simulator based on the output from the plane simulator received at block 720. Thus, in this example, the flight simulator does not have to rely on its own model of the aircraft (which may be low fidelity) but can rely on the outputs of the plane simulator (which may be a higher fidelity simulator) to set the flight parameters. For example, the plane simulator may determine that the user actions have set off an alarm (or caused an alarm to turn off) in which case the work flow engine can instruct the flight simulator to output the alarm either visually or audibly (or conversely to cease outputting the alarm). In another example, if the plane is taxing, the plane simulator can determine how much the user actions turned the aircraft and the flight simulator can then update its output to visually simulate the turn. In yet another example, if the user tilted the aircraft while flying, the plane simulator can calculate the affect this has on the airspeed, direction, and other flight parameters and the flight simulator can then update its output to visually simulate the user action.

In one aspect, the work flow engines using the outputs of the plane simulator to set or change the state of the flight simulator.

In one aspect, as part of performing block 745 the work flow engine may translate the outputs received by the plane simulator into inputs that can be received by the flight simulator, such as converting between namespaces or using a data format that is recognizable to the flight simulator.

The method 400 then returns to block 710 where the method 700 repeats to determine whether new events indicate the next step has been performed correctly.

When the user has completed the lesson successfully (or aborted the lesson), the method 700 can proceed to block 750 where the work flow engine stores the lesson results. In one aspect, the work flow engine can track the trainee's progress through the lesson. This can include tracking which steps the trainee performed correctly and which were performed incorrectly. This information can be used to with other training information such as in-plane training and classroom instruction to give a complete picture of the trainee's progress and achievements.

Figure 8:
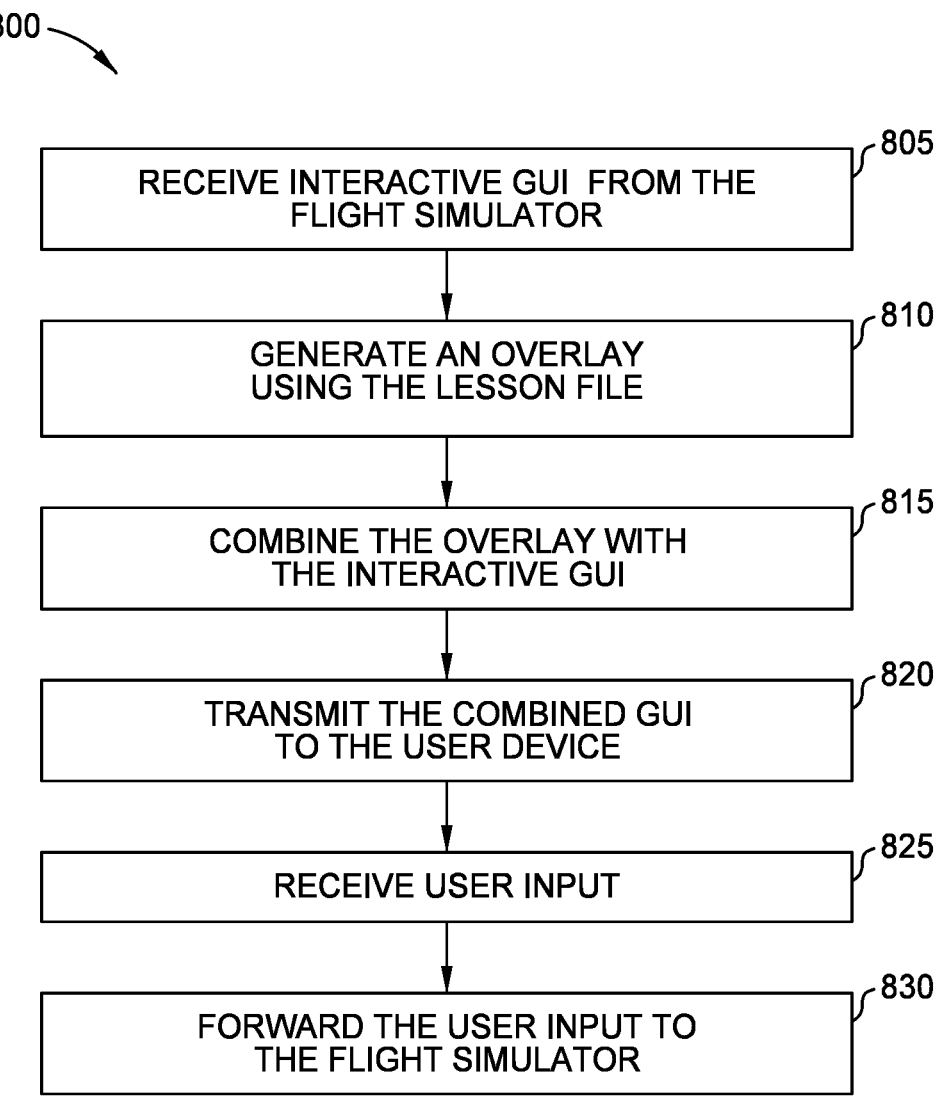
FIG. 8 is a flowchart for generating interactive graphical user interfaces by a flight simulator for a training lesson, according to one aspect

FIG. 8 is a flowchart of a method 800 for generating interactive graphical user interfaces by a flight simulator for a training lesson, according to one aspect. The method 800 is used to provide lesson instructions and other resources to the trainee as an overlay to the GUIs generated by the flight simulator. For example, the method 800 may be used in the method 700 to display lesson information to the trainee as well as receive input from the trainee. Further, the method 800 assumes that user device is remote from the computing system executing the flight simulator and the plane simulator, an example of which is illustrated in FIG. 6.

At block 805, an overlay generator (e.g., the overlay generator 520 in FIG. 5) receives an interactive GUI from the flight simulator. The interactive GUI can be the GUI 540 in FIG. 5. The interactive GUI can include simulated aircraft components (e.g., switches, touch screens, controls, pedals, etc.) in the cockpit of the aircraft which the user can control.

At block 810, the overlay generator generates an overlay using the lesson file. The overlay can include a step (or multiple steps) of the lesson. The overlay can also include supplemental information about the step, such as where a particular aircraft component can be found in the cockpit, information on why the step should be performed, and the like. The overlay can also include one or more interactive buttons to display other material on the display such as a flight manual, a video for walking the trainee through the step, help topics, and the like.

At block 815, the overlay generator combines the overlay with the interactive GUI. The portions of the overlay that include text, buttons, or other information can occlude the corresponding portions of the interactive GUI. However, the remaining portion of the overlay may be transparent so that when the overlay and the interactive GUI are combined, any portion of the GUI that is not occluded by text or objects in the overlay is visible.

At block 820, a stream engine (e.g., the stream engine 610 in FIG. 6) transmits the combined GUI formed from the overlay and the interactive GUI to a user device—e.g., a desktop, laptop, tablet, smartphone etc. The user device can be any device that includes a display and a network connection for receiving and displaying the combined GUI.

At block 825, the work flow engine receives user input from the user device. For example, the user input may be in response to the user attempting to perform a step of the lesson, which is displayed on the combined GUI transmitted to the user device at block 820.

At block 830, the work flow engine forwards the user input to the flight simulator to determine whether this generates an event. The work flow engine can then determine whether these events indicate the user did, or did not, perform the lesson step correctly. This was discussed in more detail in the Figures above.

In another aspect, rather than the work flow engine receiving user input, the flight simulator may receive the user input directly from the user device via the network. In any case, the method 800 provides techniques for a remote training environment where computing resources at a first location can generate and transmit GUIs to a user device at a second location. The user device can then forward user input to the computing resources at the first location to determine whether the user correctly performed one or more steps in a lesson. Advantageously, the user device performs relatively light-weight computing functions such as displaying the combined GUIs and generating user input which are then forwarded to the work flow engine or flight simulator. This enables training to be performed on a wider range of user devices.

In the current disclosure, reference is made to various aspects. However, it should be understood that the present disclosure is not limited to specific described aspects. Instead, any combination of the following features and elements, whether related to different aspects or not, is contemplated to implement and practice the teachings provided herein. Additionally, when elements of the aspects are described in the form of "at least one of A and B," it will be understood that aspects including element A exclusively, including element B exclusively, and including element A and B are each contemplated. Furthermore, although some aspects may achieve advantages over other possible solutions and/or over the prior art, whether or not a particular advantage is achieved by a given aspect is not limiting of the present disclosure. Thus, the aspects, features, aspects and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects described herein may be embodied as a system, method or computer program product. Accordingly, aspects may take the form of an entirely hardware aspect, an entirely software aspect (including firmware, resident software, micro-code, etc.) or an aspect combining software and hardware aspects that may all generally be referred to herein as a "circuit," "module" or "system." Furthermore, aspects described herein may take the form of a computer program product embodied in one or more computer readable storage medium(s) having computer readable program code embodied thereon.

Program code embodied on a computer readable storage medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to aspects of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various aspects of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may in fact, be executed substantially concurrently, or the blocks may sometimes be executed in the reverse order or out of order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While the foregoing is directed to aspects of the present disclosure, other and further aspects of the disclosure may be devised without departing from the basic scope thereof, and the scope thereof is determined by the claims that follow.

What is claimed is:

1. A method, comprising:

ingesting unstructured data comprising a plurality of procedures for operating an aircraft;

converting the unstructured data into semi-structured data comprising multiple steps for each of the plurality of procedures;

converting the steps in the plurality of procedures into data structures with an actor-verb-object format, wherein the data structures are application programming interface (API) statements;

mapping the data structures to components in the aircraft; and mapping the components in the aircraft to corresponding components in a software flight simulator.

2. The method of claim 1, wherein the data structures are expressed in a data interchange format.

3. The method of claim 1, wherein the API statements are experience application programming interface (xAPI) statements.

4. The method of claim 1, wherein the unstructured data comprises a flight manual for operating the aircraft.

5. The method of claim 1, wherein converting the unstructured data into the semi-structured data comprises:

identifying a pattern in which the steps for each of the plurality of procedures must be performed in order to perform the plurality of procedures correctly.

6. The method of claim 1, wherein converting the steps in the plurality of procedures into the data structures comprises:

selecting, in response to user input, a procedure from the plurality of procedures to create a training lesson;

receiving textual description for at least one step in the selected procedure; and packaging the data structures for the selected procedure and the textual description into a file that is executable by the software flight simulator.

7. The method of claim 6, wherein the file is a JavaScript Object Notation (JSON) file.

8. The method of claim 6, further comprising:

modifying a step in the selected procedure by at least one of adding a new data structure with the actor-verb-object format or removing one of the data structures in the selected procedure.

9. A system, comprising:

a processor; and a memory including instructions that when executed by the processor enable the system to perform an operation, the operation comprising:

ingesting unstructured data comprising a plurality of procedures for operating an aircraft;

converting the unstructured data into semi-structured data comprising multiple steps for each of the plurality of procedures;

converting the steps in the plurality of procedures into data structures with an actor-verb-object format, wherein the data structures are application programming interface (API) statements;

mapping the data structures to components in the aircraft; and mapping the components in the aircraft to corresponding components in a software flight simulator.

10. The system of claim 9, wherein the data structures are expressed in a data interchange format.

11. The system of claim 9, wherein the API statements are experience application programming interface (xAPI) statements.

12. The system of claim 9, wherein the unstructured data comprises a flight manual for operating the aircraft.

13. The system of claim 9, wherein converting the unstructured data into the semi-structured data comprises:

identifying a pattern in which the steps for each of the plurality of procedures must be performed in order to perform the plurality of procedures correctly.

14. The system of claim 9, wherein converting the steps in the plurality of procedures into the data structures comprises:

selecting, in response to user input, a procedure from the plurality of procedures to create a training lesson;

receiving textual description for at least one step in the selected procedure; and packaging the data structures for the selected procedure and the textual description into a file that is executable by the software flight simulator.

15. The system of claim 14, wherein the operation further comprises:

modifying a step in the selected procedure by at least one of adding a new data structure with the actor-verb-object format or removing one of the data structures in the selected procedure.

16. A non-transitory computer-readable medium containing computer program code that, when executed by operation of one or more computer processors, performs an operation comprising:

ingesting unstructured data comprising a plurality of procedures for operating an aircraft;

converting the unstructured data into semi-structured data comprising multiple steps for each of the plurality of procedures, wherein the data structures are application programming interface (API) statements;

converting the steps in the plurality of procedures into data structures with an actor-verb-object format;

mapping the data structures to components in the aircraft; and mapping the components in the aircraft to corresponding components in a software flight simulator.

17. The non-transitory computer-readable medium of claim 16, wherein the data structures are expressed in a data interchange format.

18. The non-transitory computer-readable medium of claim 16, wherein the API statements are experience application programming interface (xAPI) statements.

19. The non-transitory computer-readable medium of claim 16, wherein converting the unstructured data into the semi-structured data comprises:

identifying a pattern in which the steps for each of the plurality of procedures must be performed in order to perform the plurality of procedures correctly.

20. The non-transitory computer-readable medium of claim 16, wherein converting the steps in the plurality of procedures into the data structures comprises:

selecting, in response to user input, a procedure from the plurality of procedures to create a training lesson;

receiving textual description for at least one step in the selected procedure; and packaging the data structures for the selected procedure and the textual description into a file that is executable by the software flight simulator.

* * * * *